(12) United States Patent
Mouly et al.

(10) Patent No.: US 8,676,185 B2
(45) Date of Patent: Mar. 18, 2014

(54) METHOD FOR OPTIMISING TRANSMISSION RESOURCES BY INTER-CELLULAR LOOP IN A MOBILE CELLULAR RADIO-COMMUNICATION NETWORK AND CORRESPONDING LOCAL NETWORK AND ADAPTORS

(75) Inventors: Michel Mouly, Palaiseau (FR); Didier Verhulst, La Celle Saint Cloud (FR); Pierrick Cheval, Orvault (FR)

(73) Assignee: CELL & SAT, Paris (FR)

( * ) Notice: Subject to any disclaimer, the term of this patent is extended or adjusted under 35 U.S.C. 154(b) by 518 days.

(21) Appl. No.: 12/863,046

(22) PCT Filed: Jan. 14, 2009

(86) PCT No.: PCT/EP2009/050391
§ 371 (c)(1),
(2), (4) Date: Oct. 29, 2010

(87) PCT Pub. No.: WO2009/090193
PCT Pub. Date: Jul. 23, 2009

(65) Prior Publication Data
US 2011/0039540 A1 Feb. 17, 2011

(30) Foreign Application Priority Data
Jan. 15, 2008 (FR) ...................................... 08 50230
Jun. 25, 2008 (FR) ...................................... 08 54241

(51) Int. Cl.
*H04W 4/00* (2009.01)
*H04W 40/00* (2009.01)
(52) U.S. Cl.
USPC ......... 455/422.1; 455/445; 370/329; 370/338

(58) Field of Classification Search
USPC ........................................................ 455/422.1
See application file for complete search history.

(56) References Cited

U.S. PATENT DOCUMENTS 5,761,195 A * 6/1998 Lu et al. ........................ 370/329
2002/0072380 A1 * 6/2002 Takashima et al. ........... 455/461

(Continued)

FOREIGN PATENT DOCUMENTS

EP              1603351 A1     12/2005
EP              1850605 A1     10/2007

(Continued)

OTHER PUBLICATIONS

English Translation of International Preliminary Report on Patentability for corresponding International Application No. PCT/EP2009/050391 filed Jan. 14, 2009.

(Continued)

*Primary Examiner* — Olumide T Ajibade Akonai
*Assistant Examiner* — Natasha Cosme
(74) *Attorney, Agent, or Firm* — David D. Brush; Westman, Champlin & Koehler, P.A.

(57) ABSTRACT

A method and apparatus are provided for transmitting data exchanged by two terminals in a cellular radiocommunication network, each of the terminals being respectively associated with a base station of the cellular network. The method includes: identifying a shortened transmission path between the base stations, the shortened transmission path defining a direct transmission path for the data between the base stations without transiting via transcoding equipment present in the cellular radiocommunication network; and transmitting at least a portion of the data via the shortened transmission path, which is also called an intercellular loop-back operation.

12 Claims, 8 Drawing Sheets

(56) References Cited

U.S. PATENT DOCUMENTS

| | | | |
|---|---|---|---|
| 2005/0036470 A1* | 2/2005 | Calvert | 370/338 |
| 2005/0259614 A1 | 11/2005 | Farineau et al. | |
| 2006/0154660 A1 | 7/2006 | Waugh et al. | |
| 2009/0215455 A1 | 8/2009 | De Jaeger et al. | |

FOREIGN PATENT DOCUMENTS

| | | |
|---|---|---|
| GB | 2316272 A | 2/1998 |
| WO | 9635302 A1 | 11/1996 |
| WO | 2007104743 A1 | 9/2007 |

OTHER PUBLICATIONS

ETSI GSM 08 52 "GSM 8.52 v8.0.0 BDC-BTS Interface; Interface Principles" Jun. 1, 2000.

International Search Report, dated May 5, 2009 for corresponding International Application No. PCT/EP2009/050391, filed Jan. 14, 2009.

French Search Report, dated Nov. 21, 2008 for corresponding French Application No. 0854241, filed Jun. 25, 2008.

French Search Report, dated Nov. 26, 2008 for French Application No. 0854240.

\* cited by examiner

METHOD FOR OPTIMISING TRANSMISSION RESOURCES BY INTER-CELLULAR LOOP IN A MOBILE CELLULAR RADIO-COMMUNICATION NETWORK AND CORRESPONDING LOCAL NETWORK AND ADAPTORS

CROSS-REFERENCE TO RELATED APPLICATIONS

This Application is a Section 371 National Stage Application of International Application No. PCT/EP2009/050391, filed Jan. 14, 2009 and published as WO 2009/090193 on Jul. 23, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of communication networks. More precisely, the disclosure relates to cellular networks especially but not exclusively those such as GSM (Global System for Mobile) or UMTS (Universal Mobile Telecommunications Service).

The disclosure applies to all cellular networks for which it is useful to optimise the use of transmission resources.

It applies particularly, but not exclusively, to a cellular network comprising for example a satellite radio connection, allowing a set of stations to, called base transceiver stations (BTS in a GSM network), to be connected to the base station controllers (BSC for a GSM network). In this case, the satellite resource is naturally one that is expensive to use, and one for which it is useful to optimise and economise as far as possible.

The an aspect of the disclosure is therefore especially suited to the implementation of a cellular network in zones where communication traffic is relatively low, such as rural areas for example, and where classic techniques involve relatively high investments and operating costs compared to the low traffic level.

However it applies more generally to any situation where the management of resources is critical.

BACKGROUND OF THE DISCLOSURE

Firstly, it should be noted that for clarity, the disadvantages of the prior art are presented for the case of the GSM standard. However, aspects of this disclosure apply to all types of cellular networks, such as those for example defined by the 3GPP (third generation partnership project). A person skilled in the art could thus easily implement this disclosure in a UMTS or other type of network.

The growing popularity of the GSM system throughout the world has led operators to deploy this service not just in the metropolitan regions but also increasingly in rural and more isolated or distant zones. In the latter type of region, the land infrastructure is often inadequate or poorly adapted to provide good network coverage. A satellite radio-communication system is in this case a very good means of extending the GSM network and this type of system is today widely used in many regions of the world.

However, the satellite radio resources still remain expensive, and the problem of this type of application lies in the techniques of reducing bandwidth required for the transmission of data and improving the quality via satellite radio.

Such a problem remains valid in the case where two users are located in a same geographical cell, or at least located in geographical cells that are close to one another. In such a case, it can be understood that classic GSM network transmission techniques, which in essence are centralised, consume traffic resources that are considerably higher than if they were optimised.

To make this clearer, the disadvantages of the prior art will be described below in the specific case of a GSM system implemented via a satellite connection, and in which two users located in a same cell or in two cells that are sufficiently close in the GSM network, downstream of the satellite connection, are in communication.

1.0 GSM Architecture

In relation to FIG. 1, the classic architecture of a GSM type cellular network comprises a mobile switching centre (MSC) 106, a base station controller (BSC) 102 (and 103) and one or several base transceiver stations (BTS) 100 (and 101).

Each BTS provides the GSM radio coverage in one or several cells. For example, in relation to FIG. 1, the BTS 100 is controlled by the BSC 102 and covers the geographical cell C1, in which is located at least one user with a radio-communication mobile station (MS) T1.

More precisely, the MSC controls the configuration of the calls for each incoming or outgoing call, and acts as an interface with the other telecommunication networks. Each communication made with the MSC 106, which controls several BSC (102, 103) via TRAU code conversion and adaptor equipment (104, 105).

The BSC allocates the radio channels required for each call. It handles the intercellular transfers between two BTS'. A single BSC supports several BTS' which cover a wide geographical zone.

Finally, the role of a BTS is to support the GSM radio transmission with the users of mobile stations. The BTS' are located close to pylons which carry antennae, and are spread out in the geographical zone covered by the cellular network.

The GSM standard and its developments, as defined by the 3GPP group, use voice compression. This compression is carried out by TRAU (104, 105). According to the GSM standard, the TRAU (104, 105) may be implemented on the MSC site, on the BSC site or even on the BTS site. The financial considerations tend to have the TRAU (1204, 105) preferably implemented on the MSC site, in order to reduce the transmission costs.

Several types of codecs have been defined by the 3GPP group. The GSM FR (full rate) codec operates at a rate of 13 Kbit/s. The GSM HR (half rate) and EHR (enhanced full rate) respectively operate at 5.6 Kbit/s and 12.2 Kbit/s. After code conversion, speech at 64 Kbit/s compressed to 13/12.2 Kbit/s (respectively 5.6 Kbit/s) is transmitted to the BTS in a time slot of 16 Kbit/s (respectively 8 Kbit/s). According to the 3GPP TS 08.60 (respectively TS 08.61) specification, compressed speech is transmitted to the BTS every 20 ms according to the TRAU frame format.

These same principles apply to AMR (adaptative multi rate) FR and HR rates.

The TRAU frame transports, in addition to compressed speech information, "control bit" type information which allows the quality of the communications to be optimised between the code conversion entity and the encoding-decoding channel codec unit (CCU) of the BTS. These control bits especially allow the synchronisation of the information exchanged, to define the type of coding used (FR, EFR, HR or AMR) and also to indicate the discontinuity of the transmission due to the silences in the speech (DTX).

In order to introduce the implementation of a satellite connection in a cellular network, we will now describe briefly, in relation to FIG. 2, the interfaces used and their denomination between the main entities previously introduced.

The interface between a MSC (106) and a TRAU (104, 105) is called interface A.

The interface between a BSC 102 and the BTS 100 is called the Abis interface.

In the case where the TRAU 104 is implemented on the MSC site, the interface between the TRAU 104 and the BSC 102 is called Ater.

A satellite connection may be used in the transmission chain for each of these interfaces. The main problem of the insertion of a satellite connection onto one of these interfaces is therefore to determine how to transmit efficiently the information required whilst minimising the radio band required for the satellite transmission.

The Abis interface connects a BSC to a BTS and has one or several 2 Mbit/s connections (ITU G703/G704 standard). This is one of the interfaces that is classically implemented for satellite transmission.

This Abis interface transports traffic data, such as compressed speech and signal information.

On the Abis interface, there are two types of signal information which circulate:
  signal messages exchanged with the BTS, transported in a specific signal channel, which allow the BTS equipment itself to be controlled as well as the mobile terminals (MS) that are in communication with it. The corresponding messages are specified by the GSM in the TS 08.58 specification;
  in-band control information which is transmitted in the same flow as the traffic information. This information is transmitted in the TRAU frames. This information is composed of control bits, which are complementary to the data bits, and are explained in the TS 08.60/08.61 specifications.

The first type of signal information; composed of protocol messages, are transported in dedicated time slots, with typically on the Abis interface a rate of 64 Kbit/s.

Each 2 Mbit/s connection of the Abis interface has 31 time slots (TS) that are allocated to signal channels or speech channels. Depending on the type of network and speech coding choices, a 2 Mbit/s connection on the Abis intervals may typically be used to support up to ten radio "transmission" access or transceiver (TRX) channels. Each TRX itself supports eight GSM full rate channels dedicated to speech or sixteen GSM half rate channels. The corresponding reservation for the speech channels on the Abis interface represents for each TRX an allocation of 2 TS at 64 Kbits/s (8*16 Kbits/s=16*8 Kbits/s=128 Kbits/s).

According to the size of the GSM network, the BTS is equipped with a number N of TRXs, which leads to a proportional occupation of the number of TS' on the Abis interface.

2. Satellite Applications

In relation to FIGS. 2A and 2B, a classic GSM network implementing a satellite radio type connection will be described.

The GSM network thus usually comprises for each of the cells a MSC 106, a TRAU 104 (both in the NWK network), a BSC 102 and a base station BTS 100, which provides communication for the users with a mobile terminal T1 that are located in the coverage zone of the BRS 100.

Still in relation to FIGS. 2A and 2B, the set-up comprising the TRAU code converters (104, 105) and the MSC network communication centre(s) (106) in the NWK network form the core of the cellular network and is called the central connection network.

Furthermore, a radio connection LR is implemented on the Abis interface, between the BSC 102 and the BTS 100. This radio connection LR is for example provided by a satellite radio system containing emitter-receiver antennae on each side of the Abis interface, and a satellite 11.

It may be noted that in fact it is possible to insert a satellite radio connection on each of the interfaces implemented in the GSM system: A, Abis, Ater. However inserting such a satellite connection on the Abis interface, which is to say between the BSC and the BTS, is preferred to extend the GSM service to distant geographical locations with low user densities with minimal infrastructure costs.

In order to avoid any confusion, it is important to note that in such an implementation, two types of radio systems are used, but they do not have the same role:
  the GSM network itself uses first radio connection means to communicate, and especially to make the transmission between the BTS and the mobile terminal users.
  the satellite system consists of a second radio transmission connection. Usually, a device called a hub allocates the radio resources required for the transmission of the data by satellite between the BSC and the BTS.

In fact, when two users are communicating, the usual set-up in a GSM network demands that the speech flow passes via the BSC, as well as via the TRAU and the MSC. This thus requires the allocation of resources on two channels with satellite connection: the uplink and the downlink. This remains especially true regardless of the position of the users (callers and receivers) without the possible proximity of the users being taken into account.

3. Known Loop Architecture

In relation to FIG. 2B, according to known architecture, a station adaptor CST 100A and a gateway adaptor CSG 102A for allowing the communications to be looped in a local loop zone. Local looping may thus be obtained by locally looping the communications of two terminals that are controlled by a same BTS or as is shown in FIG. 2B, in a zone controlled by a single station adaptor 100A. Within this known architecture, it is therefore possible not to transmit all of the data to the MSC 106 (nor to the BSC 102 nor to the TRAU 104, 105). Consequently the uplink connection network (intermediate network) that uses the LR radio connection, which allows bandwidth to be economised and the transit time for the data which composes the transmission to be reduced.

4. Disadvantages of the Prior Art

At present, the implementation of a radio connection, especially by satellite, between the BTS base stations and their corresponding BSC of a cellular network leads to, during a communication between two users each served by a different BTS connected by satellite, the allocation of two radio channels: a first channel for the receiver, and the second for the caller.

Indeed, the usual application requires that the speech "rises" up to the MSC of the GSM network. The speech flow then passes twice by the satellite (or by the backhaul network). A communication from a first cell controlled by a first BTS to a second cell controlled by a second BTS thus suffers needlessly from the addition of twice the satellite transfer time, which is around 250 milliseconds and the transmission of all of the data to their respective BSCs. The existence of this double satellite link and this data transmission to the BSCs thus adds not just a considerable transmission time which affects the quality of the communication perceived by the users, but is also very costly.

Consequently, at present there are no means which allow the nature of the proximity of a call from a first cell controlled by a first BTS to a second cell controlled by a second BTS to be specified. The current techniques thus do not manage such a configuration in an optimised manner.

In other terms, still in relation to FIG. 2A, a terminal T1, located in a zone covered by the BTS 100 that wishes to open a communication with a terminal T2, located in a zone covered by a BTS 101 uses the services of the satellite 11 twice via the LR radio connection. The data is transmitted by the BTS 100 to the BSC 102 and to the TRAU 104 that it belongs to. The TRAU 104 also communicates via a classic connection to a TRAU 105 and BSC 103 to which the BTS 101 belongs. Consequently, to establish the communication, the data transits to the BSCs and the TRAU, using the satellite radio link twice; once to go from the BTS 100 to the BSC 102/TRAU 104 and once to go from the TRAU 105/BSC 103 to the BTS 101.

SUMMARY

These various purposes, as well as others which will become clearer, are achieved by a method for transmitting data exchanged by two terminals of a cellular radio-communication network, wherein each of said terminals is respectively associated to a base station of said cellular network.

According to an illustrative embodiment of the invention, such a method comprises:
  a step for identifying a short transmission path between said base stations;
  a step for transmitting at least part of said data via said short transmission path, called the inter-cellular loop operation.

According to an embodiment of the invention, the data may comprise speech data, audio/video data or text data.

Consequently, an embodiment of the invention allows not transmitting at least part of the data to other components of the network (such as base station controllers, code converters, satellite hubs). In other terms, the resources of the network are economised and the data transit times are reduced due to the fact that the base stations communicate directly with one another. Consequently, when the communication between two terminals requires the use of a satellite link, an embodiment of the invention allows the possibility not to use this connection twice but once by allowing communication between the base stations without passing by the base station controllers.

An embodiment of the invention provides a technique which ensures a major gain in terms of service quality (delay) and cost compared to the classic techniques of the prior art in communication situations wherein there is a notion of proximity, which is to say when the stations communicating are sufficiently close to one another, as they are located in cells which are indeed controlled by different base stations, but which may start communicating without having to transmit all of the data to the respective base station controllers to which they are connected. In other terms, these cells are accessible via an backhaul meshed network (wherein such a network allows one base station to be linked directly to another). An embodiment of the invention allows multiple transmissions to be avoided via this meshed network by allowing a first terminal located in a first cell to communicate with a second terminal located in a second cell without passing the flow via the base station controllers.

The technique of an embodiment of the invention also allows the costs of the communication system to be reduced, whilst maintaining an equivalent or improved quality of service than that obtained with classic techniques.

An embodiment of the invention is in no way restricted to an implementation in a cellular network comprising a single mobile switching centre (MSC). An embodiment of invention allows the optimisation of the data transmission even when the base stations are part of the different, cellular networks, wherein these cellular networks may be managed by different telecommunications operators.

According to one original embodiment of the invention, said method for the transmission of data exchanged by two terminals of a cellular radio-communication network, wherein each of said terminals is respectively associated to a base station of said cellular network, wherein said base stations of said cellular network are controlled by at least one base station controller, and said data comprises signal information, according to a global control protocol of said cellular network, and useful data, representative of a communication between said terminals.

According to an embodiment of the invention, such a method further comprises a step for the separation of the data supplied by a first sub-flow of said terminals into two sub-flows, wherein a first sub-flow comprises at least part of the signal information, called the sub-flow for maintaining the communication at a global control level, and a second sub-flow, comprising at least part of said useful data, called the sub-flow of useful data.

Consequently, an embodiment of the invention allows waiting time due to the implementation of the global control protocol to be avoided and at the same time to reduce the bandwidth required to transmit the data to the base station controllers. Indeed, by directly transmitting the sub-flows of the useful data from one base station to another, the users do not suffer excessive transfer times, especially when using satellite transmission channels between the base stations and the base station controllers. The useful data (such as speech data) are transmitted directly from one base station to another without passing via the base station controller.

The separation of the data supplied by the first terminal may be either implemented within the base station to which the first terminal belongs or in a specific device which carries out this function.

In other terms, in one specific embodiment of the invention, in which a satellite is used as an element to transfer data between the base stations and the base station controllers, the embodiment of the invention allows a loop to be implemented on several base station/meshed network interfaces, via several adaptors when the caller and the receiver are each in different base stations and do not depend on the same radio terminal and thus on the same base station/meshed network adaptor.

According to one specific characteristic of an embodiment of the invention, said transmission method comprises a step for analysing the content of all or part of said signal messages, wherein said analysis step includes a step to search and detect in said content of said signal messages information which indicate traffic activity.

Preferably, said step for analysing all or part of said signal messages is implemented by a device situated upstream of at least one base station of the cellular network and downstream of a base station controller.

Preferably, said inter-cellular loop operation is implemented by a device situated upstream of at least one base station of the cellular network and downstream of a base station controller.

For example, it is the same device which implements the steps of analysis and inter-cellular looping-back as mentioned above.

An embodiment of the invention is thus based on a completely novel and inventive approach of direct looping of the data exchanged between a caller and a receiver when they may be directly connected by the meshed network (via the base stations). This is then described as the caller and receiver being in a loopable set, which is to say that they are connected to base stations that may communicate directly with one another. To this end, an embodiment of the invention implements a detection strategy according to which the signal flows containing a succession of messages solely intended for equipment of the cellular network are monitored and analysed, and, or in combination with, the data exchanged between the users. In function of the results of this analysis, the method of an embodiment of the invention loops the data to be transmitted in a communication, if the latter has a character of proximity, completely transparently for the cellular network, which has no knowledge of this looping. The operation of the cellular network is therefore not disrupted in the slightest.

This method thus allows the transmission times to be shortened judiciously. Furthermore, it applies to all types of data, such as data with strong real time constraints, such as speech, but also to other types of data usually exchanged via a cellular network, such as text, images, etc.

Consequently, the method allows the data transmitted between two users to be looped, when their mobile terminals belong to different base stations, which is to say when they are not situated in a same cell of a cellular network.

It may be noted that in the case of the GSM, a base station is called BTS, and the method is then implemented upstream of an Abis connection or a set of Abis connections. However, more generally, an embodiment of the invention also applies to any cellular network implementing base stations, such as UMTS in particular, which is a development of the GSM network.

Advantageously, as the base station is controlled by a base station controller that is part of a plurality of base station controllers and where the base station(s) (BTS) are connected to the base station controllers via a connection network, the inter-cellular loop consists of transporting all or part of the data exchanged between the caller and the receiver without passing via the base station controller(s) (BSC).

Consequently, in a cellular network such as GSM for example, wherein the base stations are controlled by a base station controller (BSC), the method of an embodiment of the invention implements a loop between two users in communication, so that all of the looped data is not sent up to the respective BSCs of the two base stations (BTS). They are looped directly (which is to say that the data is sent directly from one BTS to the other). This consequently differs from a classic implementation of a cellular network in which all of the data is systematically transmitted to the base station controller, regardless of the location of the persons communicating. The method of an embodiment of the invention thus allows the economy of the double data compression-decompression steps, or the code conversion, and transmission times that are too long especially in the specific case of speech, and so that this is transparent for the cellular network, which has no knowledge of the looping.

Advantageously, the succession of signal messages forms a signal flow, the detection strategy includes a step of injecting into the signal flows at least one item of information to trace the caller and/or the receiver, and to recognise the tracing information injected for the other parties.

One embodiment of the invention thus uses its detection strategy of the proximity character of a call by injecting an item of tracing information into the signal flows corresponding to each of the two parties in communication. By signal flow it is meant the succession of signal messages. The injection of an item of tracing information into the signal flow may then consist of injecting a specific message among the existing messages, or of injecting an item of information into the messages themselves. The purpose is then to find this same item of information in each of the signal flows of the caller and the receiver.

In one embodiment of the invention, and in a loop situation, only part of said data exchanged between the caller and the receiver, located in the loopable set, is transmitted to at least one of the base station controllers.

This embodiment allows the legal monitoring requirements to be satisfied, according to which all information transmitted must pass via a mobile switching centre. The objective in terms of the gain in time and the economy of compression-decompression is maintained, and an embodiment of the invention allows the radio connection to be used solely to send data. This differs from the classic techniques which are much more costly, according to which the data is sent to the base station controller and is returned. An embodiment of the invention allows just the data required for the synchronisation to be sent to the base station controller, which is to say that the base station controller only receives the information it requires so that it is aware of the communication in progress between the caller and the receiver without however all of this information being transmitted.

According to one specific embodiment of the method of the invention, said first detection phase is implemented in a first module located in a central part of the network, and said second phase for triggering an inter-cellular loop phase is implemented in said loopable set of said cellular network controlled by said first module.

For example, the first detection phase is implemented in a module close to the control centre of the meshed network, and the phase for triggering the inter-cellular looping is implemented by two modules each respectively located upstream of the base stations they are in charge of.

An embodiment of the invention further relates to a cellular network which implements the method described above.

According to an embodiment of the invention, in such a cellular network, all of the base stations depend on a network control centre and form a loopable set, wherein each base station, or each subset of base station connected to a same item of equipment for transmitting to the base station controllers, is advantageously equipped with local adaptor equipment comprising:
  means of detecting the inter-cellular loop requirement;
  means of carrying out the inter-cellular loop;
  means of detecting the inter-cellular unloop requirement;
  means of carrying out the inter-cellular unloop;
  means of implementing the method as previously described.

According to another embodiment of the cellular network according to an embodiment of the invention,
  a loopable set is formed by a base station, or a group of base stations connected to a same item of equipment for transmitting to the base station controller, is advantageously equipped with local adaptor device, and
  the network comprises an optimising device.

In this embodiment:
said central optimising device has means for detecting an inter-cellular loop requirement and or inter-cellular unloop requirement in a loopable set;
the optimising device has means for emitting an inter-cellular loop and/or inter-cellular unloop command to any adaptor device in a loopable set in which it has detected the loop and/or unloop requirement;
each of said adaptor devices has means for carrying out the inter-cellular loop or inter-cellular unloop respectively controlled by the inter-cellular loop and/or inter-cellular unloop command;
the inter-cellular network comprises said means which implement the method as described previously.

A embodiment of the invention relates to all cellular networks, of the type comprising at least one base station controlled by a base station controller and a network infrastructure with which the base station controller is connected, wherein the network infrastructure includes:
either at least one radio type connection with shared resources to connect the base station(s) to their base station controller;
or at least one IP type connection to connect said base station(s) to their base station controllers;
or even any meshed uplink connection.

An embodiment of the invention also relates to a device for optimising the transmission of data exchanged by two terminals of a cellular radio-communication network, wherein each of said terminals is respectively associated to a base station of said cellular network. According to an embodiment of the invention, such an optimising device comprises:
means of identifying a short transmission path between said base stations;
means of detecting an inter-cellular loop and/or inter-cellular unloop requirement in a loopable set;
the optimising device has means for emitting an inter-cellular loop and/or inter-cellular unloop command to any adaptor device in a loopable set in which it has detected said loop and/or unloop requirement.

Finally, an embodiment of the invention relates to any local detector and/or adaptor equipment implementing the method described above.

BRIEF DESCRIPTION OF THE DRAWINGS

Other characteristics and advantages of embodiments of the invention will become clearer upon reading the following description of several preferred embodiments, provided by way of non-restrictive example (none of the embodiments of the invention are restricted to the characteristics and advantages of this preferred embodiment), and the appended drawings, in which.

DETAILED DESCRIPTION OF ILLUSTRATIVE EMBODIMENTS

1. General Principle

An embodiment of the invention is thus based on a completely novel and inventive approach of the transmission of speech flows in a GSM network implementing a radio transmission connection, in the case where two users depend on a same base station or two base stations that are close to one another, by introducing a device which connects, within the loopable set, two mobile stations: inter-cellular looping is carried out when two users of the cellular network are communicating in a loopable set, which may include several BTS.

In other terms, rather than use the radio connection to transmit the data from a first BTS to a first BSC (associated to a TRAU code converter) then from the second BSC (associated to another TRAU code converter) to a second BTS to which it belongs, an embodiment of the invention proposes using the radio connection to transmit the data directly from the first BTS to the second BTS, thus performing inter-cellular looping. An embodiment of the invention thus allows radio resources to be economised whilst improving the quality of communications as it does not use without need and several times a same meshed network (that may be implemented by a satellite connection).

A reminder may be made that classically, the BSC communicates with the BTS(s) which belong to it by transmitting signal data via signal channels, and traffic data, containing useful data, via a traffic channel.

An embodiment of the invention thus consists, in a strategy of detecting inter-cellular looping, of analysing the signal data (using an adequate optimising device for example), whilst transmitting it to deduce:
the possibilities of inter-cellular looping, allowing the communication of data to the BSC to be avoided, and allowing the data transmission time to be reduced;
and in one preferred embodiment, the radio resources to be allocated to the satellite connection to reduce the costs.

In other terms, the messages and control information are "monitored", which originally are not intended for the satellite system or the network controller (NCC), but of which the content is analysed so as to detect the possibilities of inter-cellular looping (in the form of a shortened transmission path) and to optimise the radio resources to be allocated.

Figure 1:
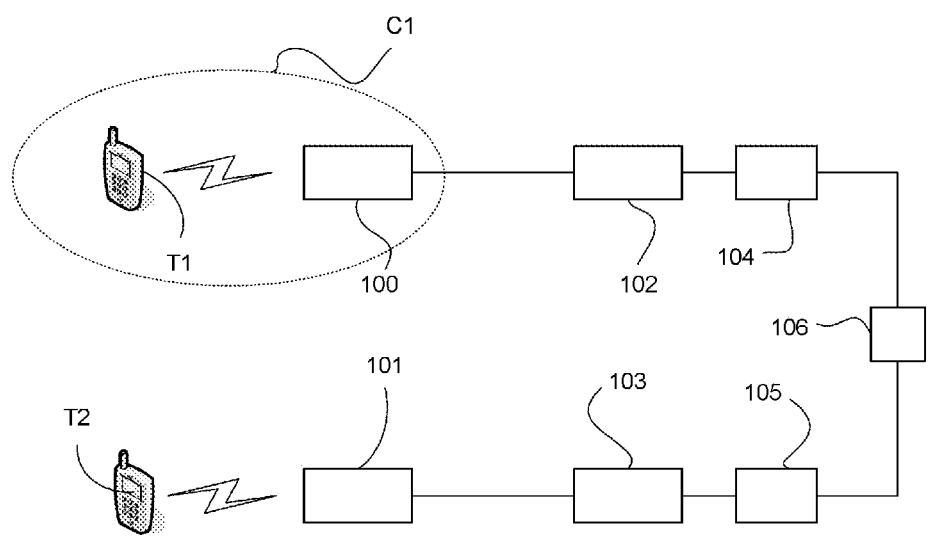
FIG. 1 is a simplified presentation of the GSM architecture.
Figure 2A:
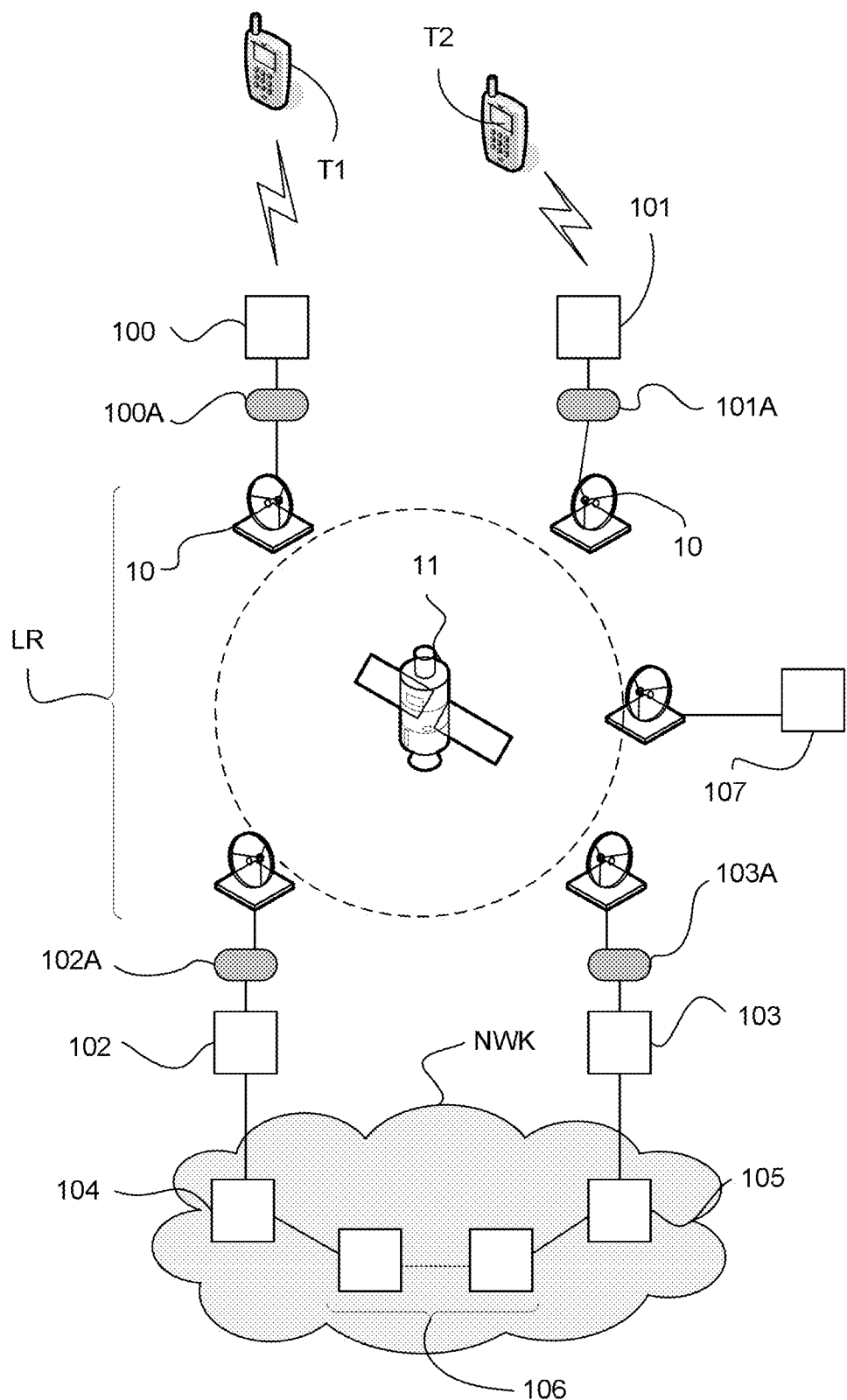
FIG. 2A is an example of GSM architecture which uses a backhaul network.
Figure 2B:
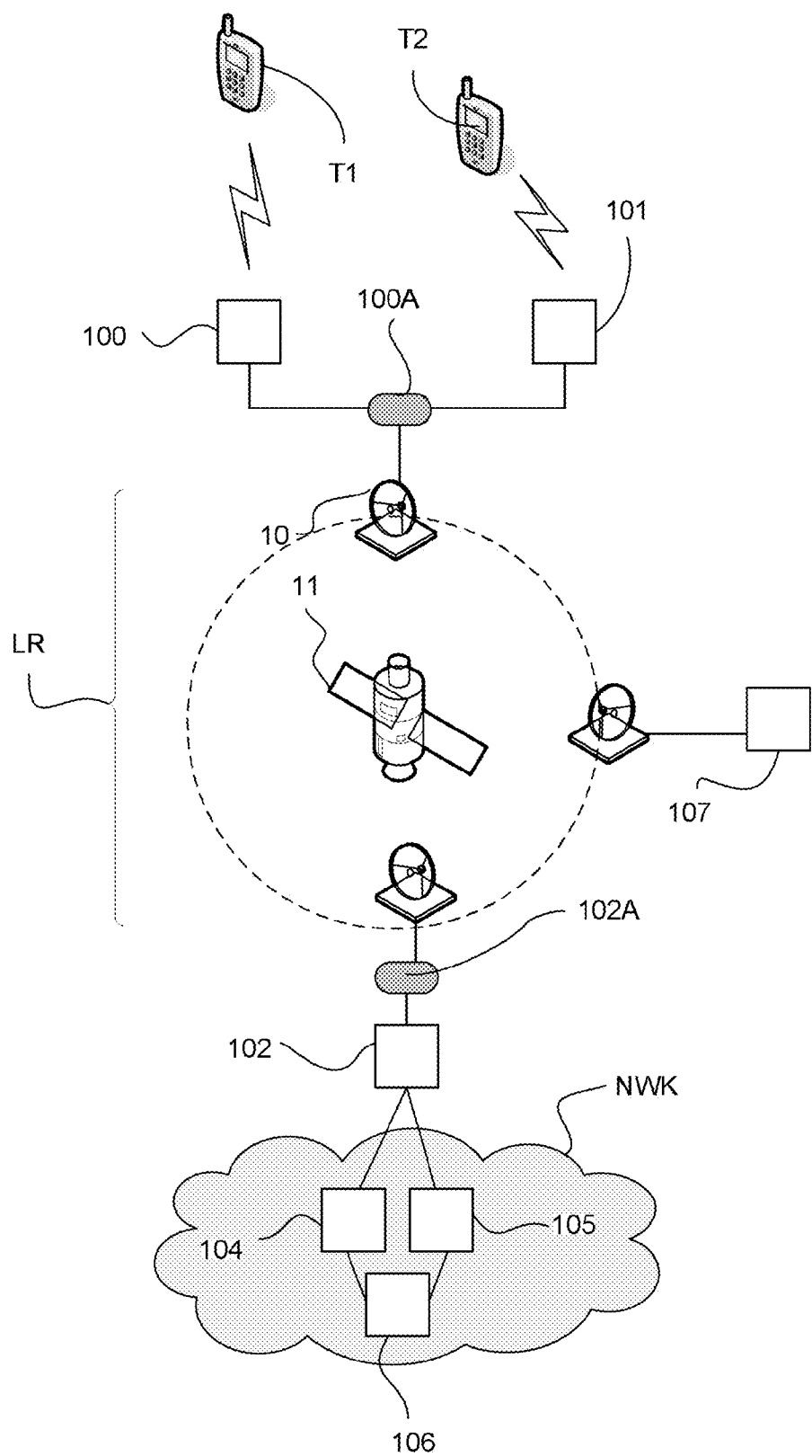
FIG. 2B is another example of GSM architecture which uses a backhaul network.

More precisely, an embodiment may be implemented by two types of devices respectively present in FIGS. 2A and 2B: a base station adaptor (100A and 101A) and a gateway adaptor (102A and 103A).

These devices are generally called adaptors and are located, in the preferred embodiment shown in FIGS. 2A and 2B, at each of the interfaces mentioned previously. They are means whose function is to observe and analyse the content of signals initially intended for the entities in the cellular network (BSC and BTS).

A third device (107) called the optimising device CSO, is responsible for analysing the content of the signals which pass through it.

In one specific embodiment, the adaptor 100A may be an integral part of the BTS 100. The exchange of data at the interfaces connected to the cellular network is generally of the circuit or "virtual circuit" type, given that the data to be transmitted is mainly speech, requiring a short time with very little variation. However, this same data is transformed to be exchanged in the form of packets on LR and IP satellite connections. The function of the adaptors 100A and 102A is therefore to transform this data from the circuit mode to the packet mode and vice versa.

According to an embodiment of the invention, the optimiser CSO 107, which identifies the possibility of transmitting useful data without passing via the BSCs, is connected to the IP network. In the embodiment of FIGS. 2A and 2B, this optimiser CSO 107 is isolated (or in parallel) on the meshed network. In another embodiment, the optimiser CSO 107 may be connected to the IP network and implement an embodiment of the invention by monitoring the IP packets which pass between the hub (via the NCC for example) and the base station controllers (BSCs). An embodiment of the invention is consequently in no way restricted to the implementation of the optimiser CSO 107 isolated or in parallel.

Figure 3A:
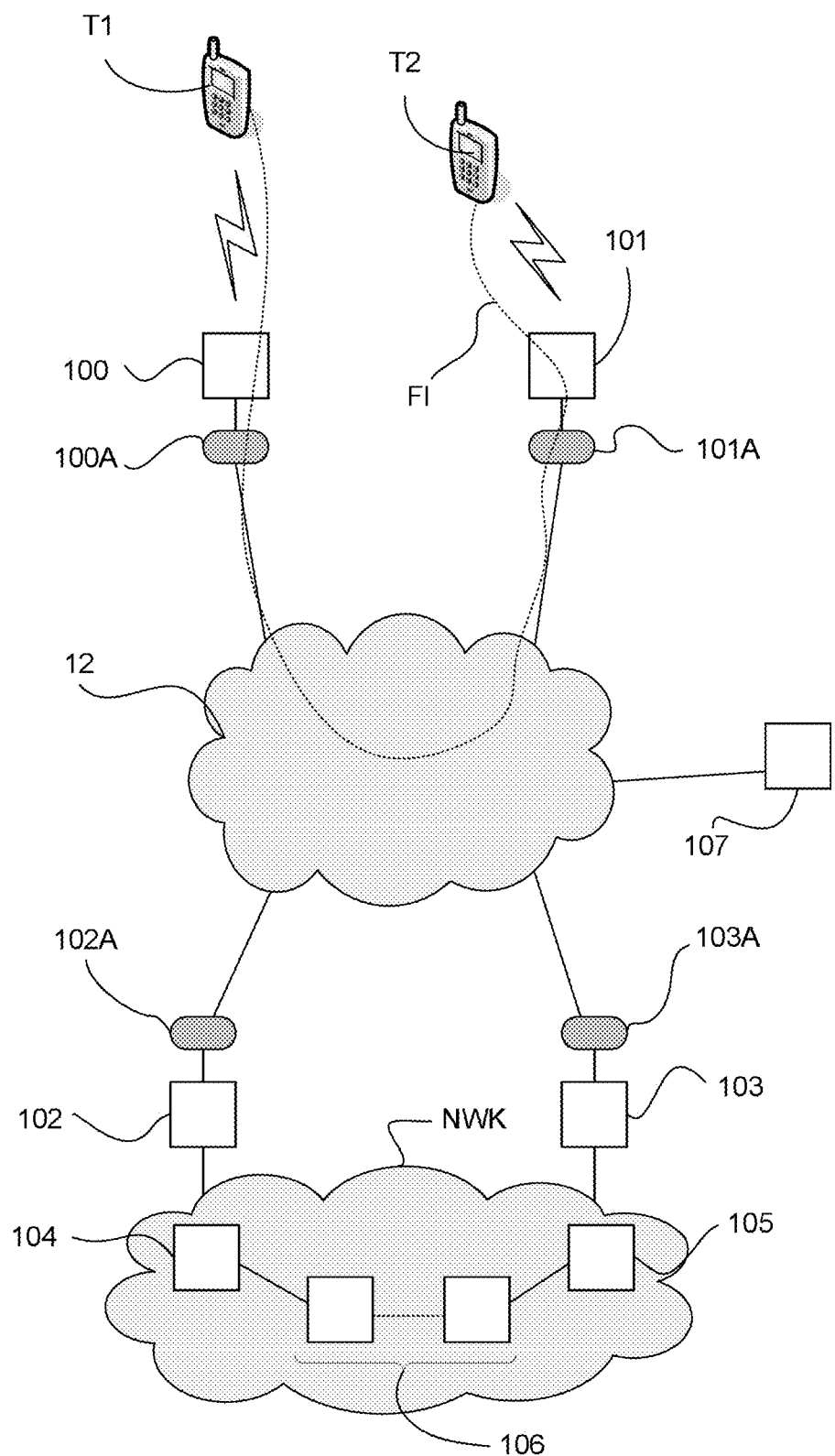
FIG. 3A is a presentation of an inter-cellular loop in a configuration comparable to that of FIG. 2A, and in which the network 12 is an IP network.
Figure 3B:
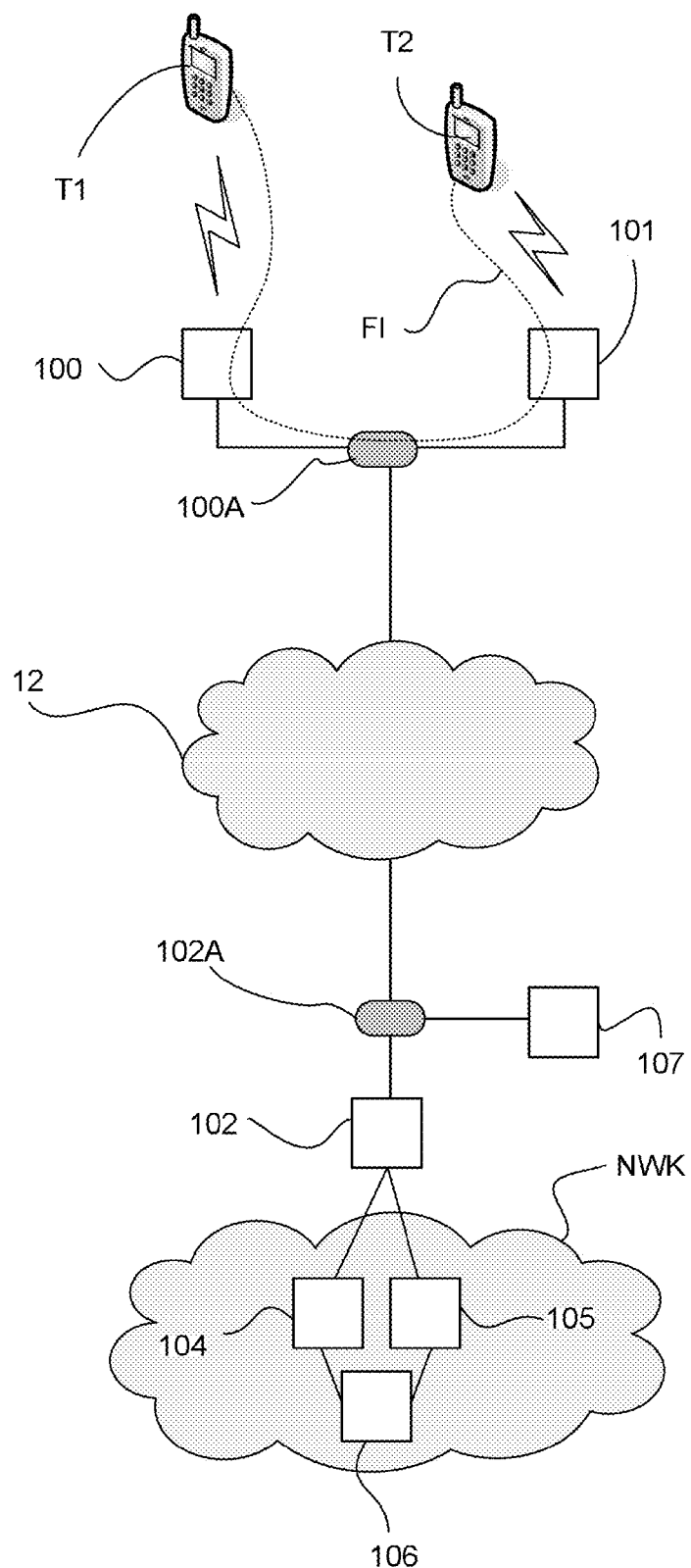
FIG. 3B is a presentation of an inter-cellular loop in a configuration comparable to that of FIG. 2B, and in which the network 12 is an IP network.
Figure 4A:
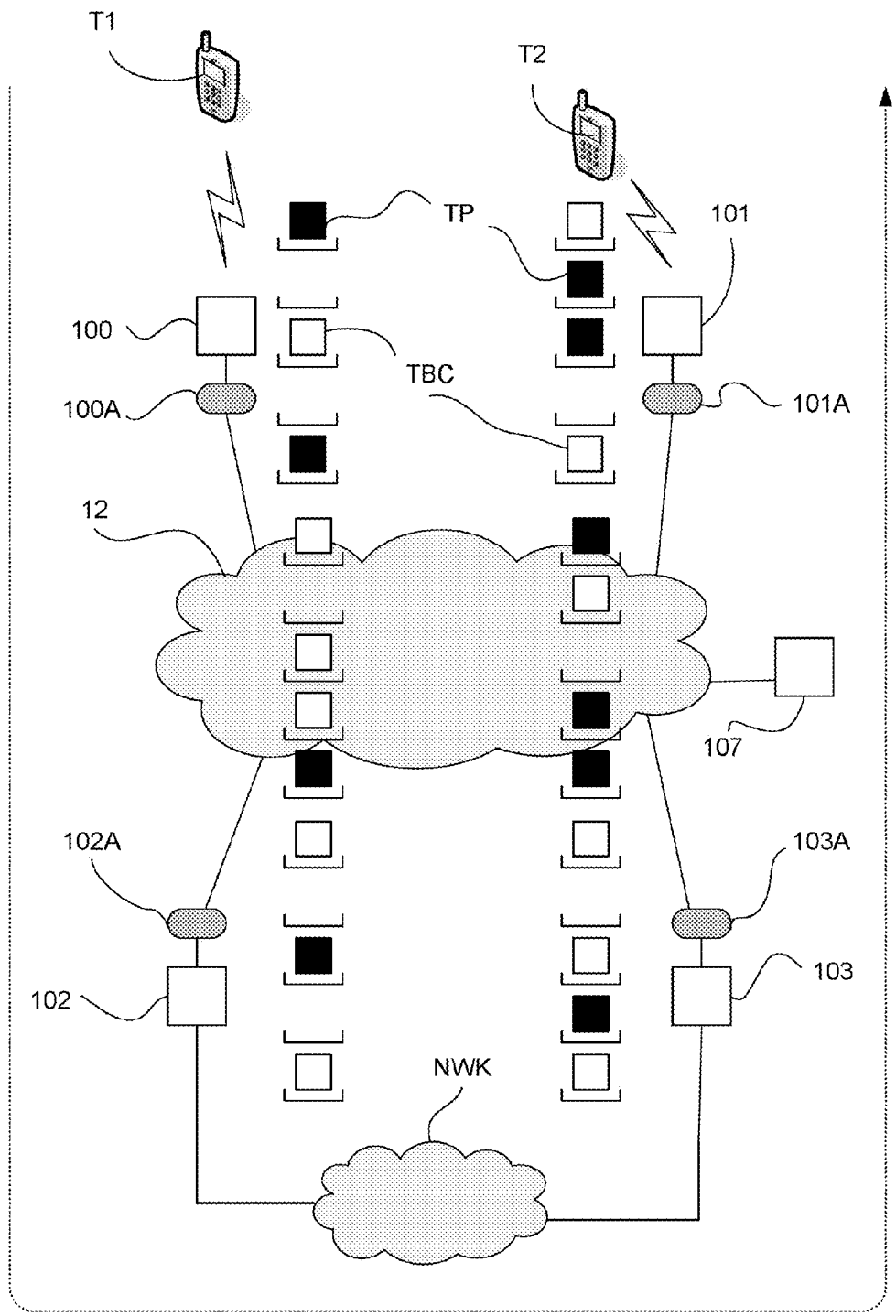
FIG. 4A details the components of the data transmitted in the classic manner via the backhaul network.
Figure 4B:
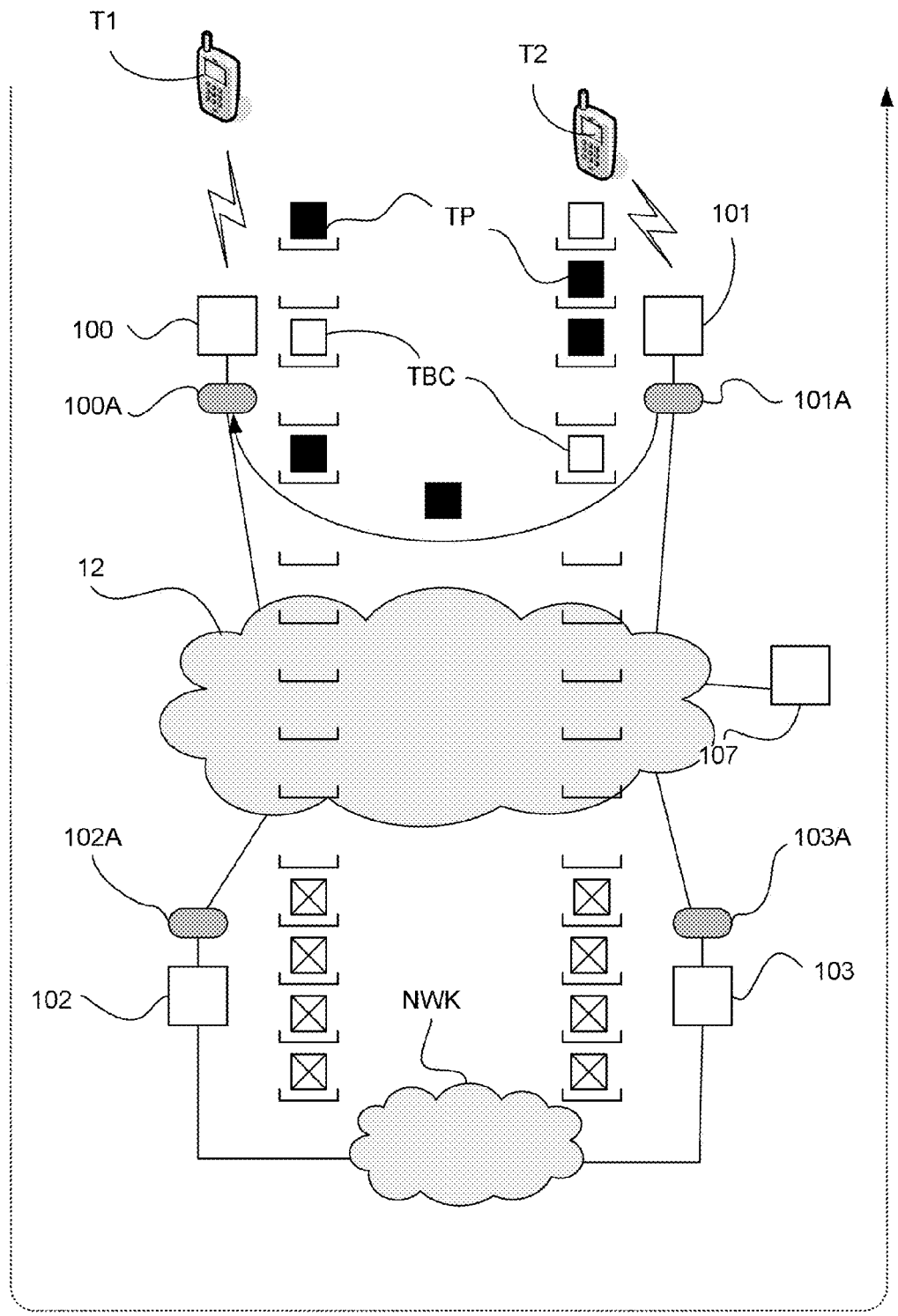
FIG. 4B details the transmission of the synchronisation data according to an embodiment of the invention via the backhaul network when looping.

The optimising device CSO 107 is shown in FIGS. 2A, 2B, 3A, 3B, 4A, 4B in various positions in the communication networks. The communication network 12 is the meshed network (for example an IP network) to which the base stations and other equipment of the GSM networks are connected. The optimising device CSO 107 may be connected directly to the meshed network (a satellite network for example) which acts as the interface between the BTS' and the BSCs as is shown in FIGS. 3A, 4A and 4B. It may also be connected to any other network (NWK) which allows the BSCs (102, 103) to be connected, as shown in FIGS. 2A and 2B. The optimising device CSO 107 may also, as is shown in FIG. 3B, be situated at the level of CSG 102A, or even CST 101A (not shown). This optimising device CSO 107, may also be situated in the core of the equipment mentioned above, which is to say implemented within a base station BTS, within a base station controller BSC for example.

The optimising device CSO 107 has, according to an embodiment of the invention, a global vision of the interconnected access network(s). It is therefore able to group BTS' and to build relationships in groups of BTS so as to allow the subsequent identification of short data transmission paths and thus to define loopable sets. The optimising device CSO 107 also comprises means of communicating with the local devices (CSG 102A or even CST 101A, see below), in addition to the command which orders the inter-cellular loop operation, network addresses which allow the identification of the BTS through which the flow data must be routed and possibly complementary information such as the best route our service class for the flow concerned.

According to an embodiment of the invention, the optimising device CSO 107 may be located anywhere on the meshed network. Furthermore, the functions of the optimising device CSO 107 may be directly integrated into one of the local devices CST 101A or CSG 102A for example.

The general principle of inter-cellular looping of an embodiment of the invention in the case of a network with an uplink radio connection with shared resources is illustrated in relation to FIGS. 3A, 4A and 4B.

The approach according to an embodiment of the invention is to transmit without loop part of the control information, whilst restricting the looping to the user data (useful data) itself. Only this type of approach allows inter-cellular looping.

An embodiment of the invention consequently makes possible that all of the control functions between BTS and TRAU operate in the same way as in a loop situation, possibly with dummy useful data. The difference between the loop and unloop modes thus only relates to the useful data itself, as the BTS and TRAU carry out their transmission protocols without intermediate emulation, and therefore identically in loop and unloop modes.

Technically, an embodiment of the invention distinguishes two types of functions fulfilled by the protocol between BTS and TRAU, and the corresponding information:
  Type I: the transmission of the user data itself (useful data, which is to say the information which encodes the speech);
  Type II: control functions, connection by connection, such as for example synchronisation, which consists of controlling the precise moment at which a TRAU sends a frame to the BTS.

All of these functions concern exchanges between BTS and TRAU described by the protocol specified in 08.60 [3].

The principle is to implement a base protocol between CST and CSG (and thus which passes via the intermediate network when present), implementing low volume exchanges between CST and CSG, transporting all or part of the protocol data required for "Type II" functions, but without the "Type I" information.

In other terms, the "Type II" functions are conserved identically to the unlooped situation. The two TRAUs thus remain in communication with their respective BTS' for these functions. For example, the time alignment function (controlled by BTS from the moment when the frames are sent by the TRAU) is maintained in the loop condition identically to the unlooped situation.

In other terms, to portray this in another way, it may be considered that this base protocol according to an embodiment of the invention implements a system of carriages, with places (intervals in a fleet) onto which containers (speech encoding data) according to the loop mode (non loop, loop without return of user data, loop with return of user data, etc.).

The base protocol mainly carries out the time alignment. By way of example, it necessarily manages at least the following fields of a TRAU FR/EFR frame, as defined by [3], which is to say the fields involved in the time alignment control function:
  C6-C11 bits of the BTS to TRAU frames (command to offset start of frame);
  T1-T4 bits both in the BTS-TRAU and TRAU-BTS directions (these bits are variable in number and permit a fine control of the size of the frame and thus the start time of the following frame);
  bits C6-C11 of the TRAU to BTS frames (frame start offset acquittal).

The method of an embodiment of the invention may advantageously be implemented within intermediate equipment such as CST which isolate between the BTS' and TRAUs.

The two FIGS. 4A and 4B show the method graphically. The numerical references of the previous figures have been conserved for clarity.

In FIG. 4A, when no loop has been implemented, the data exchanged between BTS and TRAU comprise both type I data (carriages) and useful data (represented by various squares).

The type I data transmitted on the BTS to TRAU segment allows the BTS to control the position of the carriages on the TRAU to BTS segment. Consequently, in the classic operating mode without loop, the type I data includes frames containing speech (TP), comfort data (TBC) and empty frames (allowing controls to be made).

In the case where the method described here is applied (FIG. 4B), the frame exchanges are conserved. On the CST side (100A), the useful load (speech) is removed from the rising frames (frames to the CSG 102A and the TRAU 104).

These useful loads are replaced by dummy speech (TPF) in the CSG. The speech frames (TP, TBC) are routed directly to the CST 101A and finally are inserted in the descending carriages heading to BTS 101A. Consequently, the bandwidth required in the meshed network is significantly reduced, as only empty frames are sent in it.

Furthermore, the conservation of the frames (even empty) according to an embodiment of the invention allows the equipment in the upper part of the network to conserve the reception of the (dummy) data which allows advanced functions (short messages, location, answering machine) to be conserved for terminals that have loop (local or inter-cellular).

2. Duplication/Destruction of Useful Loads

The frames are of different natures, and the loop function in the CST B 101A is not so simple as just putting the container from the CST A 100A into the next frame. FIFO (first in first out) operation is insufficient. The insertion or the deletion of the container are functions required for the loop. Two examples are provided below.

3. Insertion

In the direction TRAU to BTS, frames are sent even in the absence of speech activity. These frames contain the encoding of the comfort noise (comfort noise frames). However, in the direction BTS to TRAU, the absence of speech activity leads to an absence of transmission by the mobile terminal and thus by bad frames. The loopable set must therefore memorise the last container received from the BTS 100 which contains a comfort noise frame and fill the carriages sent to the BTS 101 with a copy of this container.

Fine dating of the frames sent from the CST 102A to the CST 103A could simplify the queuing management, by providing a simple criterion both for insertions and deletions. (The technical difficulty only exists when the CSTs are separate, and arises from the margin that needs to be left to take account of the differences in transmission times through the intermediate network. A frame may arrive too early).

4. Deletion

If an operations and maintenance frame is sent from the TRAU to the BTS, it is not possible to put a container on hold. The device must therefore delete a container that may be there.

Furthermore, an asynchronisation between BTS' may cause a drift which makes the queue at the CST 102A fill up quicker than it empties. This may create the requirement to delete old data from the CST 103A, in favour of more recent data. In the case of CSTs that are physically separate, the margin which compensates the variability in the transmission time must be taken into account in the decision to delete data.

5. Detection Strategy

In order to loop the speech, it is above all necessary to detect the relative location of the two users in the same communication reliably. The strategies for detecting the proximity allow such loop possibilities to be detected. These detection strategies may include detection by analysis of signal messages (CONNECT message of two half-calls).

In a cellular network such as GSM, as soon as a user makes or receives a call, the equipment immediately generate a series of signal message exchanges, creating a call start or call received. The network thus manages a large quantity of half-calls of this type. When two users are in communication, the half-call transmitted by the caller is heavily correlated to the half-call received by the receiver.

Another detection possibility may be based on an analysis of the speech flow (the direct correlation of the speech flows is made at the start of the communication and triggers the loop when the TFO mode is used).

6. Legal Requirements for Monitoring

The consequence of the inter-cellular looping according to an embodiment of the invention is that the MSC does not receive the speech flow (the useful data is only transmitted at the base station). In certain countries or networks the possibility of legal monitoring is mandatory, and the speech must pass via an MSC so that the legal monitoring as specified in the standard is possible.

To overcome this problem, the disclosure proposes, in one specific embodiment, to transmit the speech flow to the MSC. Such a technique restricts the gain obtained by the inter-cellular loop but does not cancel it out.

Indeed, a reminder may be made that without the loop, the speech passes twice through the meshed network in each direction. Whereas even if all of the information is sent to the BSCs then to the MSC, the speech is still completely transferred directly between BTS', which halves the transfer time between two terminals.

The technique of an embodiment of the invention is based on the fact that the descending speech flow may be eliminated without restricting the possibility of legal monitoring.

More precisely, two users of mobile stations T1 and T2 are communicating and are located in a same loopable set (a BTS group). They are therefore in the loopable set and a loop operation is carried out on the two speech flows. In order to satisfy the legal monitoring requirements, the adaptor 100A combines the two speech flows to transmit them to the MSC in a signal via the meshed network 12 and the BSC 102.

It is also possible to transmit the two flows independently of one another. The combination thus allows one channel to be gained.

Such a combination may be achieved in several ways, and each approach must be tested to evaluate the best performances.

In a first example, the flow codes are converted, added together and then code converted again: this approach is costly. In a second example, a selection is made frame by frame, selecting one of the two speech flows. This leads to a loss in the quality of speech when the two parties speak at the same time. Finally, it is also possible to transmit the two flows by putting them in sequence. This technique ensures that no speech is lost and is the equivalent to the use of a good allocation algorithm in the case where the two speech flows are transmitted independently of one another.

7. Optimiser Device

Figure 5:
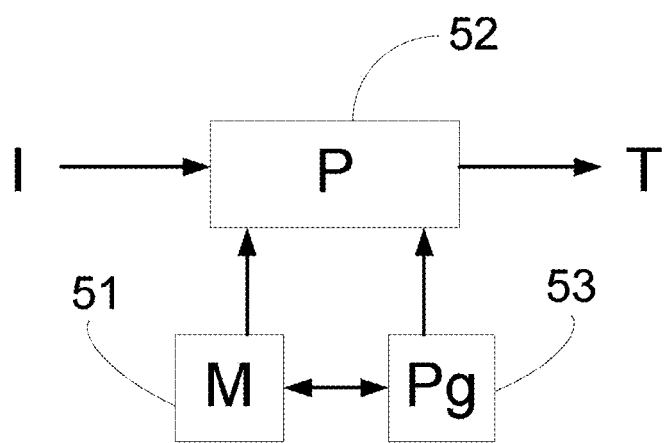
FIG. 5 describes briefly an optimising device according to the invention.

In relation to FIG. 5, the succinct physical architecture of an optimising device according to an embodiment of the invention will be described. Such a device comprises a memory 51 formed by a buffer memory, a processing unit 52 equipped for example with a microprocessor 0, and piloted by the computer programme 53, implementing the data transmission method according to an embodiment of the invention.

Upon initialisation, the computer programme 53 code instructions are for example loaded into a RAM memory before they are executed by the processing unit 52. The processing unit 52 receives in input (I) a set of messages forming a conversation between the users. The microprocessor of the processing unit 52 implements the steps of the method described above, according to the instructions of the computer programme 53, to carry out inter-cellular looping. For this purpose, the engine comprise, in addition to the buffer memory 51, means of identifying a short path. It comprises means of transmitting data via the short transmission path to carry out the loop operation (T) for the user. These means are piloted by the microprocessor of the processing unit 52.

8. Return to the Unloop State

There are many cases where providing all of the GSM services requires a loop mode communication to be switched back to an unloop mode if certain services are activated after the call has been established. This requires on the one hand the detection of the requirement to switch back to unloop mode, which may be achieved by analysis of the signal, and on the other hand to modify the routing of the user data. The pertinent point is the modification of the routing.

Among the examples of events which require the removal of the loop mode, the movement of the users may be mentioned, which leads to a handover as the communication is no longer local. Other examples come from additional services, especially those which involve several simultaneous calls. A typical scenario is as follows: when a communication, local and looped, is in progress between two users A and B, the user A receives a call waiting from a user C. The user A puts the A-B communication on hold and opens an A-C communication that is not local; the loop state is not satisfactory and the communication between A and the TRAU on which it depends (and connects to C via the MSC) is fully restored.

In a TFO type operating mode, the TRAUs are not synchronised on the BTS' in the loop mode. When switching to a non loop mode, a synchronisation phase is necessary, which requires specific means and which also has an impact on the user data. There is no break in the protocol between the BTS and the TRAU, viewed either by the TRAU or the BTS, the modifications when switching from loop to non loop concern mainly the real or dummy status of the user data.

9. Technical Additions

9.1 Flow Rate to be Transmitted

One major disadvantage of the approach is to request data exchanges on the intermediate network in loop mode. To place an order of magnitude on this, an Abis frame transporting full rate speech totals 320 bits on average, 260 of which are for the speech. However in the remaining 60 bits, only a part requests to be transported between BTS and TRAU, which should not exceed about 20 bits.

According to one specific embodiment, careful encoding of "mini-frames" in loop mode allows this defect to be limited. In particular, encoding with representations of variable size allows the information to be transmitted to be reduced to a very small amount (around one octet) for statistically significant cases. For example, the most common frame in an FR communication should be (C1–C5=FR, C6–C11=No change, BFI, TAF, T1–T4=1111), which may be encoded according to an embodiment of the invention, by forcing the compression for 3 bits (one for BFI, one for TAF and one escape bit to distinguish it from the other cases). It may also be envisaged to reduce the flow rate further by only transmitting the mini-frames which differ from the most common case, or the previous one, etc.

More generally, the encoding specified by the standard TS GSM 08.60 is not optimised, and leaves space for optimising by re-encoding. For example the field C1-C5 encodes the type of frame, and thus allows 32 different cases, whereas in a typical application only two or three types of frames are used.

Note: for the meaning of the fields, refer to the standard TS GSM 08.60.

9.2 Configuration of the CST and CSG

Once the decision has been made to switch to loop mode, the CST and CSG must be configured in the mode chosen. The denominations of the previous figures are conserved. Furthermore, a reminder is made that the description is limited to one direction of transmission of user data. The role of the equipment is permutated for the other direction, which is to say the physical device fulfilling the role of CST A 100A for a given direction fulfils the role of CST B 101A for the other direction.

9.3 CST A 100A

In total loop mode, the CST A 100A:
sends the CST B 101A, possibly after code conversion in a format specific to the CST/CSG provider (which is to say not that of the standard) the frames received from the BTS (by frame, it is meant the user data and all or part of the control information), wherein this is transmitted via the routing point (inside the device when there is a single CST, or via the intermediate network when there are separate CSTs);
sends to the CSG A 102A after code conversion to a format specific to the CST/CSG provider, of all or part of the control data of the frames received from the BTS.

In partial loop mode (allowing legal monitoring), the CST A 100A:
sends the CST B 101A, in a format specific to the CST/CSG provider (which is to say immediately switched to partial loop mode, then switched for a period to non loop mode (decided by configuration). This time allows data losses to be avoided due to the addition to the transmission time caused by passing through the intermediate network (especially for satellite transmission).

If the latency time is nil (which is to say that the data is not transmitted twice), the user will perceive a silence whose duration will be equivalent to around the return transmission time added by the intermediate network (several hundred milliseconds) in the case of satellite transmission. A duration that is not nil allows other approaches for the CST B 101S.

9.4 CSG A 102A

The CSG A 102A has identical operation in all modes: it develops the information received from the CST A 100A into frames compliant with the GSM standard and sends them to the TRAU via the BSC. If it receives a frame containing user data, it develops it with this data; if it only receives control information, it adds dummy speech data.

There is consequently no need for unlooping (or looping) instructions to be sent to the CSG A 102A.

9.5 CSG B 103A

In total or partial loop mode, the CSG B 103A:
sends to the CST B 101A, after code conversion to a format specific to the CST/CSG provider, all or part of the control data for the frames received from the TRAU. Upon receipt of a unlooping instruction (from the deciding device), the CSG B 103A immediately switches to non loop mode.

9.6 CST B 101A

In total or partial loop mode, the CST B 101A:
constructs frame envelopes from control information received from the CSG B 103A;
populates the user data of these frames from data received from the CST A 100A;
sends the frames thus constructed to the BTS.

During unloop, the CST B 101A can receive (according to the configuration of the CST A 100A function) during a certain time data twice, from the CST A 100A and from the CSG B 103A. The data from the CST A 100A arrives in hundreds of items per millisecond ahead of similar data from the CSG B 103A. In a simple embodiment, with a brutal switch to non loop mode when the data arrives from the CSG B 103A, the user receives the information twice, which is like a stutter. Another possibility: to propose more sophisticated approaches than silence or stuttering.

Simple approaches (silence or repeating) do not require unlooping instructions. The more complex approaches may request them. As the unlooping is received by the equipment as part of its function of CST A 100A for the other direction, this indication may be used in cases of more sophisticated approaches to handle the transition.

Although the present disclosure has been described with reference to one or more examples, workers skilled in the art will recognize that changes may be made in form and detail without departing from the scope of the disclosure and/or the appended claims.

The invention claimed is:

1. A method for transmitting data exchanged by first and second terminals of a cellular radio-communication network comprising a radio-communication infrastructure network, wherein each of said terminals is respectively associated to a base station of said radio-communication infrastructure network, the method comprising:
   a step of analyzing the content of all or part of signaling messages exchanged by said terminals with the radio-communication infrastructure network;
   a step of identifying, based on the step of analyzing, a short transmission path between said base stations, wherein said short transmission path defines a direct data transmission path between said base stations without passing via transcoding equipment present in said cellular radio-communication network, each of said base stations being respectively connected to local adaptor equipment; and
   a step of transmitting at least part of said data via said short transmission path passing through said local adaptor equipment.

2. The method according to claim 1, wherein said base stations of said cellular radio-communication network are controlled by at least one base station controller, wherein said data comprises control information, according to a global control protocol of said cellular network, and user data that is representative of a communication between said terminals, and wherein the method further comprises a step of separating the data supplied by a first of said terminals into two sub-flows, wherein a first sub-flow comprises at least part of the control information, called a sub-flow for maintaining the communication at a global control level, and a second sub-flow, comprising at least part of said user data, called a sub-flow of user data.

3. The method according to claim 2, wherein said step of analysing content of all or part of signalling messages exchanged by the terminals with the radio-communication infrastructure network includes a step of searching and detecting in said content of said signalling messages information that indicates traffic activity.

4. The method according to claim 3, wherein said step of analysing all or part of the signalling messages is implemented by a device situated upstream of at least one base station of the cellular radio-communication network and downstream of a base station controller.

5. The method according to claim 3, wherein said step of analysing all or part of the signalling messages is implemented inside a base station controller.

6. The method according to claim 3, wherein the base station is controlled by a base station controller that is part of a plurality of base station controllers and where the base station(s) are connected to the base station controllers via a meshed backhaul network, wherein the inter-cellular loop comprises transporting all or part of the data exchanged between said terminals without passing via a central connection network of said cellular network.

7. The method according to claim 3, wherein a succession of the signalling messages forms a signalling flow, wherein the method includes a step of injecting into the signalling flow at least one item of information to trace at least one of said terminals, and to recognise at least one item of tracing information during said analysis step.

8. The method according to claim 1, wherein only part of said data exchanged between terminals is transmitted to at least one transcoder.

9. The method according to claim 1, wherein said inter-cellular loop operation is implemented by a device that is situated upstream of at least one base station of the radio-communication infrastructure network and downstream of a base station controller.

10. A cellular network comprising a radio-communication infrastructure network and first and second terminals, wherein each of said terminals is respectively associated to at least one base station of said radio-communication infrastructure network, the cellular network comprising:
    means for analyzing the content of all or part of signaling messages exchanged by the terminals with the radio-communication infrastructure network;
    means for identifying, based on said analysis, a short transmission path between said base stations, wherein said short transmission path defines a direct data transmission path between said base stations without passing via transcoding equipment present in said cellular radio-communication network; and
    means for implementing transmissions between the terminals through said short transmission path.

11. The cellular radio-communication network according to claim 10, wherein said at least one base station is controlled by at least one base station controller, and wherein at least one loopable set composed of one base station, or one set of base stations connected to a same item of equipment for transmitting to base station controllers is equipped with local adaptor equipment, wherein said cellular radio-communication network comprises:
    an optimising device comprising means for detecting an inter-cellular loop requirement and/or inter-cellular unloop requirement between said terminals;
    the optimising device further comprising means for emitting an inter-cellular loop and/or inter-cellular unloop command to said adaptor equipment; and
    wherein said adaptor equipment has means for carrying out an inter-cellular loop or inter-cellular unloop responsive to the inter-cellular loop and/or inter-cellular unloop command, respectively.

12. An optimising device for transmission of data exchanged by first and second terminals, of a cellular radio-communication network comprising a radio-communication infrastructure network, wherein each of said terminals is respectively associated to a base station of said radio-communication infrastructure network, wherein the optimizing device comprises:
    means for analyzing content of all or part of signaling messages exchanged by the terminals with the radio-communication infrastructure network; and
    means for identifying, based on said analysis, a short transmission path between said base stations, wherein said short transmission path defines a direct data transmission path between said base stations without passing via transcoding equipment present in said cellular radio-communication network and to which each of said base stations is respectively connected.

* * * * *

UNITED STATES PATENT AND TRADEMARK OFFICE
CERTIFICATE OF CORRECTION

PATENT NO.        : 8,676,185 B2
APPLICATION NO. : 12/863046
DATED             : March 18, 2014
INVENTOR(S)       : Mouly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this
Twenty-ninth Day of September, 2015

Michelle K. Lee
*Director of the United States Patent and Trademark Office*